United States Patent [19]
Inkester et al.

[11] Patent Number: 5,307,388
[45] Date of Patent: Apr. 26, 1994

[54] CONTAINMENT STRUCTURES

[75] Inventors: John E. Inkester, Warrington; Leslie Denholm, Sale; Bruce H. Thurrell, Stockport, all of United Kingdom

[73] Assignee: British Nuclear Fuels plc, Cheshire, United Kingdom

[21] Appl. No.: 888,135

[22] Filed: May 26, 1992

[51] Int. Cl.$^5$ .............................................. G21C 13/00
[52] U.S. Cl. ............................ 376/272; 376/293; 52/249; 52/288.1; 220/408
[58] Field of Search ............... 376/272, 273, 274, 285, 376/293-296; 52/249, 288; 220/408, 425

[56]        References Cited
          U.S. PATENT DOCUMENTS

| | | | |
|---|---|---|---|
| 4,458,458 | 7/1984 | Orii | 376/272 |
| 4,473,974 | 10/1984 | Orii et al. | 376/250 |
| 4,477,409 | 10/1984 | Schoening et al. | 376/296 |
| 4,764,336 | 8/1988 | Aubert et al. | 376/272 |

*Primary Examiner*—Daniel D. Wasil
*Attorney, Agent, or Firm*—Nixon & Vanderhye

[57]           ABSTRACT

A containment structure (1) for storage of nuclear fuel or liquids which have been in contact with nuclear fuel includes a concrete wall (3) and a concrete floor (2) with a corrosion resistant liner (5) fixed to and in contact with the walls and floor except at the junctions of the walls and floor at which the liner is curved to provide "soft corners" (7) to permit movement of the liner relative to the concrete walls and floor.

The term "soft corner" as used in the context of the present specification denotes a region providing a gap or empty space or collapsible or compressible material, eg foam, between the stainless steel liner and the concrete walls and floor. Any collapsible or compressible material employed needs to be stable to the radioactive environment and for this reason it is preferred that a gap or empty space is employed.

The containment structure may be a cooling pond for nuclear fuel elements or a dry secondary structure built around or beneath parts of a liquid-containing process plant for nuclear fuel elements.

7 Claims, 1 Drawing Sheet

CONTAINMENT STRUCTURES

BACKGROUND OF THE INVENTION

1. Field of the Invention

The present invention concerns containment structures for storage of nuclear fuel or containment of liquids which are or have been in contact with nuclear fuel and includes ponds and containment structures for the storage of irradiated nuclear fuel elements under water and structures housing nuclear fuel processing plant which, in an emergency, might be required to act to contain liquid discharged from the processing plant.

2. Discussion of Prior Art

Nuclear fuel elements such as those discharged from a nuclear reactor are stored under water in ponds for a period prior to reprocessing in order to allow radioactivity to decay acceptable levels. As the water is radioactive it is essential to avoid leakage resulting in contamination of the ground and the risk of pollution of the water table. For this purpose the concrete floor and walls of the pond can be lined eg with stainless steel sheets. It is important that such a lining is not stressed beyond predetermined allowable limits during both normal operating conditions and extreme hazard conditions. Extreme hazards are considered to be those with a low probability of occurrence (typically $10^{-4}$) generating forces in the lining significantly beyond working conditions, eg earthquakes.

Where dry structures house processing plant secondary containment can be provided by a stainless containment structure having a steel lining. The secondary containment would in the event of a rupture of the primary containment, eg a liquid-containing process pipe or vessel, serve to contain the liquid in a manner similar to containment of liquid in a pond. This secondary lining is therefore required to resist the same extreme hazard conditions which can affect fuel storage ponds.

Various means have been provided in the prior art for resisting such hazards. None has proved entirely satisfactory.

SUMMARY OF THE INVENTION

According to the present invention there is provided a containment structure having a concrete wall and a concrete floor with a corrosion resistant liner fixed to and in contact with the walls and floor except at the junctions of the walls and floor at which the liner is curved to provide "soft corners" as herein defined to permit movement of the liner relative to the concrete walls and floor.

The term "soft corner" as used above and in the context of the present specification denotes a region providing a gap or empty space or collapsible or compressible material, eg foam, between the stainless steel liner and the concrete walls and floor. Any collapsible or compressible material employed needs to be stable to the radioactive environment and for this reason it is preferred that a gap or empty space is employed.

The containment structure may be a cooling pond for nuclear fuel elements or a dry secondary structure built around or beneath parts of a liquid-containing process plant for nuclear fuel elements.

The concrete wall and floor to which the liner is fixed may meet at an angle which may be substantially a right angle. The liner may comprise corrosion resistant metal sheets which are fitted together with welds between them, the sheets at the corners being curved to provide the soft corner. The sheets may be of stainless steel. The sheets may be fixed to the adjacent concrete walls or floor by bars of T-shape cross-section embedded in the concrete with their head appearing flush with the surface of the concrete. The sheets may be welded to the heads of the T-bars, desirably at the welds between sheets.

The structure according to the present invention effectively allows the liner to float on the concrete whilst still maintaining a high degree of fixity to the concrete surface. The flexibility thus provided, not shown in the prior art structures, beneficially allows large thermal and seismics displacements of the liner to be resisted.

BRIEF DESCRIPTION OF THE DRAWINGS

Embodiments of the present invention will now be described by way of example, with reference to the accompanying diagrammatic drawings, in which.

DETAILED DISCUSSION OF PREFERRED EMBODIMENTS

Figure 1:
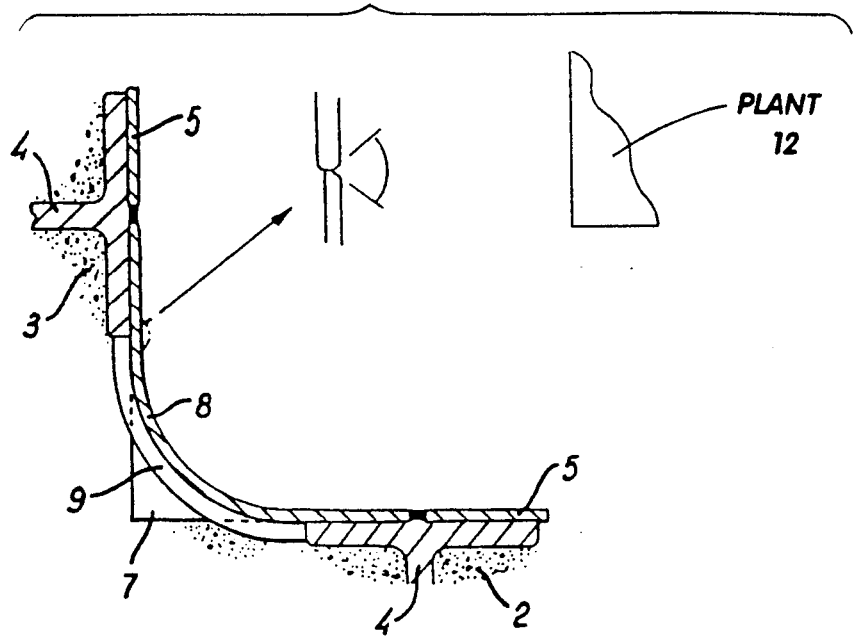
FIG. 1 is an end sectional view of a containment structure showing a liner at a wall/floor junction.

A stainless steel liner formed from individual sheets of stainless steel covers the concrete floor and walls of a cooling pond 1. The liner provides the primary containment for the cooling water.

An anchorage grillage is cast in the concrete floor 2 and walls 3 of the pond and is anchored into the concrete by an arrangement of reinforcing bars (not shown). The grillage can include T-bars 4 which are embedded in the concrete so that the top surface of the T-bar is flush with the surface of the concrete. The T-bars 4 are spaced apart at distances equal to the dimensions of the individual liner sheets 5. It will be realized that other forms of grillage for anchorage are possible.

Figure 2:
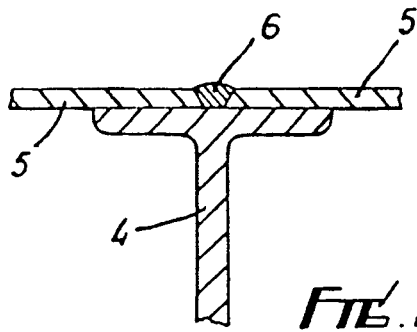
FIG. 2 shows, in section, an anchorage for the liner shown in FIG. 1.

The stainless steel liner sheets 5 are cut to size and the edges of the sheets 5 are prepared for welding and then tacked to the grillages in the floor and walls leaving a gap between the sides of the adjacent sheets 5 which coincides with the center of each T-bar. This is shown in FIG. 2. The liner is completed by filling the gaps with weld material 6 which fuses the sheets 5 together and welds the sheets 5 to the T-bars 4.

Stresses generated in the liner are dealt with in two ways. Some of the force is transmitted to the concrete through the T-bars 4 and reinforcings bars. The remainder is dissipated by allowing a certain amount of liner movement.

To permit the liner sheets 5 to move relative to the concrete under seismic and thermal loading conditions, so-called "soft corner" regions are arranged at the junction of the side edges of the floor 2 with the respective bottom edge of each of the walls 3 of the pond 1. The soft corners 7 are formed by curved stainless steel sheets 8 which provide a smooth interconnection between the adjacent wall and floor sheets 5. At the soft corner the curved sheet 8 can be supported by a plate 9 of the same curvature as the sheet 8 and which can be welded at its ends to the T-bars 4.

Figure 3:
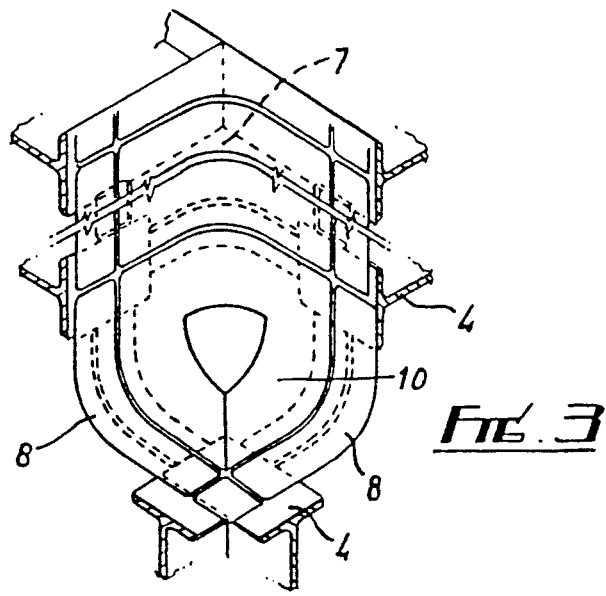
FIG. 3 shows a perspective view of the liner shown in FIG. 1 at a corner of the containment structure.

FIG. 3 shows the liner assembly at a lower corner of the cooling pond. In this case a prefabricated corner piece 10 is employed to provide the soft corner at the corner of the pond. The corner piece 10 is welded at its edges to adjacent liner sheets 5.

In an alternative embodiment the structure providing secondary containment around liquid carrying vessels or pipes employed in a plant 12 for processing nuclear fuel elements may be constructed in a manner similar to that shown in FIG. 1.

We claim:

1. A containment structure, said structure comprising:
   a concrete wall;
   a concrete floor; and
   a corrosion resistant stainless steel liner fixed to and in contact with said wall and floor except at junctions of the wall and floor at which the liner is curved to provide soft corners to permit movement of the liner relative to the concrete wall and floor, said soft corners including a region providing an empty space between the liner and the concrete wall and floor at the junctions of the wall and floor, wherein the liner comprises sheets fixed to an adjacent concrete wall or floor by bars of T-shape cross-section embedded in the concrete with their head appearing flush with the surface of the concrete.

2. A containment structure as in claim 1 and which is a cooling pond for nuclear fuel elements.

3. A containment structure as in claim 1 and which is a dry secondary structure built around and in combination with a liquid-containing process plant for nuclear fuel elements.

4. A containment structure as in claim 1, and wherein the concrete wall and floor to which the liner is fixed meet at an angle.

5. A containment structure as in claim 4 and wherein the said angle is substantially a right angle.

6. A containment structure as in claim 1 and wherein the liner comprises corrosion resistant metal sheets which are fitted together with welds between them, the sheets at the corners being curved to provide the soft corner.

7. A containment structure as in claim 1 and wherein said sheets are welded to the heads of the T-bars at welds between sheets.

* * * * *